(12) United States Patent
Lerow et al.

(10) Patent No.: US 6,215,271 B1
(45) Date of Patent: Apr. 10, 2001

(54) CHARGING SYSTEM HAVING A CONTROLLED RECTIFIER BRIDGE AND A SINGLE VOLTAGE SENSOR

(75) Inventors: Kevin E. Lerow, Lowell; Albert M. Heyman, Bedford, both of MA (US); Kevin J. Donegan, Merrimack, NY (US)

(73) Assignee: SatCon Technology Corporation, Cambridge, MA (US)

(*) Notice: Subject to any disclaimer, the term of this patent is extended or adjusted under 35 U.S.C. 154(b) by 0 days.

(21) Appl. No.: 09/310,052

(22) Filed: May 11, 1999

(51) Int. Cl.[7] ........................................ H02J 7/00
(52) U.S. Cl. .................................... 320/104; 322/58
(58) Field of Search ........................ 320/104, DIG. 28, 320/DIG. 29; 322/28, 58

(56) References Cited

U.S. PATENT DOCUMENTS

| | | | |
|---|---|---|---|
| 3,673,489 | 6/1972 | Riff | 322/28 |
| 3,760,259 | 9/1973 | Tharman | 322/28 |
| 4,239,978 * | 12/1980 | Kofink | 307/16 |
| 4,431,959 | 2/1984 | Remmers | 320/160 |
| 4,459,536 | 7/1984 | Wirtz | 322/10 |
| 4,489,323 | 12/1984 | Glennon et al. | 363/87 |
| 5,254,935 * | 10/1993 | Vercesi et al. | 320/104 |
| 5,473,240 | 12/1995 | Moreira | 318/801 |
| 5,590,032 | 12/1996 | Bowman et al. | 363/15 |
| 5,594,321 * | 1/1997 | Kohl et al. | 320/DIG. 13 |
| 5,642,021 | 6/1997 | Liang et al. | 318/146 |
| 5,648,705 * | 7/1997 | Sitar et al. | 322/20 |
| 5,663,631 | 9/1997 | Kajiura et al. | 322/29 |
| 5,694,311 | 12/1997 | Umeda et al. | 322/16 |
| 5,719,486 | 2/1998 | Taniguchi et al. | 322/28 |
| 5,742,498 | 4/1998 | Taniguchi et al. | 322/16 |
| 5,793,167 * | 8/1998 | Liang et al. | 322/17 |
| 5,891,590 * | 4/1999 | King | 320/139 |
| 5,929,613 * | 7/1999 | Tsuchiya et al. | 322/58 |

FOREIGN PATENT DOCUMENTS

342128 A1   3/1985   (DE) .

* cited by examiner

Primary Examiner—Adolf Deneke Berhane
Assistant Examiner—Pia Tibbits
(74) Attorney, Agent, or Firm—Dike, Bronstein, Roberts & Cushman, LLP; George W. Neuner (57) ABSTRACT

A charging system has an alternator, a battery, and a controlled rectifier bridge between the alternator and the battery. The controlled rectifier bridge has controllable elements. A controller is provided wherein the controller controls (a) the duty cycle of the alternator field winding and (b) the switching in the controllable elements to control the phase advance angle. By utilizing a half-wave controlled rectifier bridge and three controllable elements, power output can be increased at a low overall cost. In another embodiment, the controller determines switching points for the controllable elements through a third harmonic extraction device which employs a neural network for determining the zero crossings of the third harmonic voltage obtained from a single phase voltage.

25 Claims, 8 Drawing Sheets

CHARGING SYSTEM HAVING A CONTROLLED RECTIFIER BRIDGE AND A SINGLE VOLTAGE SENSOR

BACKGROUND OF THE INVENTION

1. Field of the Invention

The present invention relates generally to vehicle charging systems, and more particularly to a charging system having a half-wave or a full-wave controlled rectifier bridge and a single voltage sensor.

2. Background

Figure 1:
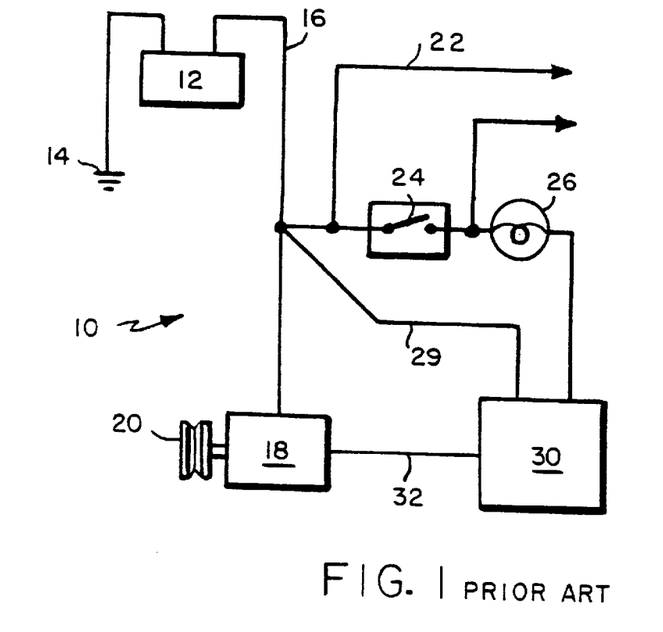
FIG. 1 is a schematic representation of a prior art vehicular charging system.

A typical prior art charging circuit 10 is depicted in FIG. 1. The charging system provides electrical energy while the engine is running to recharge the battery and to power electrical devices. As shown in FIG. 1, a battery 12 is connected between a ground 14 and a positive or "hot" lead 16, which leads to the electrical systems (not shown) of the vehicle and to the alternator 18. This lead 16 is a path for current out of the battery 12 during undercharging or discharging, and a path for current into the battery 12 during charging. The alternator 18 is typically driven by a pulley 20, which is driven by a belt (not shown) from the prime mover or engine (not shown). The electrical systems of the vehicle are powered through lead 22. An ignition switch 24 is also connected to the hot lead 16. Typically, an indicator lamp 26 is present to indicate a discharge state. A voltage regulator input lead 28 connects to the voltage regulator 30, which determines the output of the alternator 18 by controlling the excitation voltage provided to the field winding of the alternator via line 32, as will be discussed in greater detail below.

The basic layout of a vehicle alternator is well known. An alternator is typically a three-phase AC generator that typically comprises a rotor, which is essentially a spinning magnetic field which is turned by the vehicle's engine, and a stator, which is a stationary output winding. The operation is based on Faraday's law of electromagnetic induction. As the rotor is moved creating a varying magnetic field, electromotive force, or EMF, is induced in the windings resulting in current output. In order to produce a magnetic field in the rotor, field windings in the rotor are connected to a source of excitation current. The output from each of the three phases is AC, which is then rectified into DC through a rectifier bridge.

Figure 2:
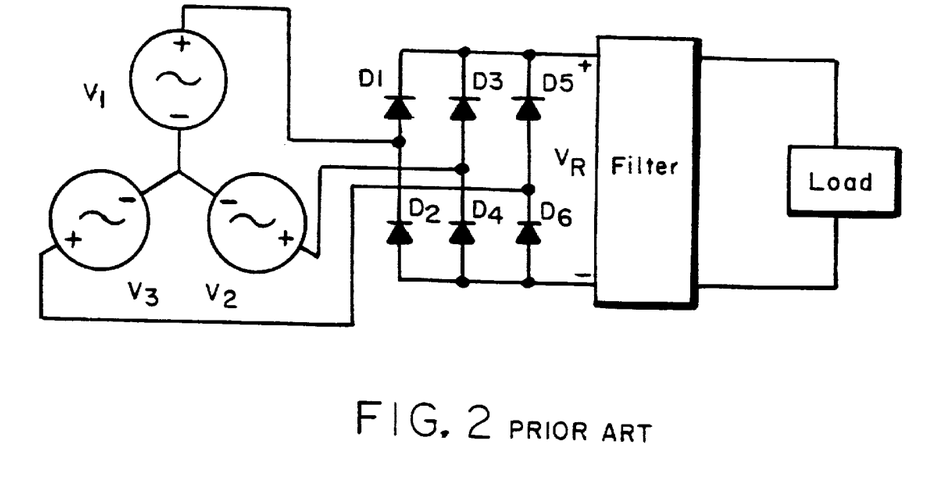
FIG. 2 is a schematic representation of a prior art alternator rectifier bridge.
Figure 3:
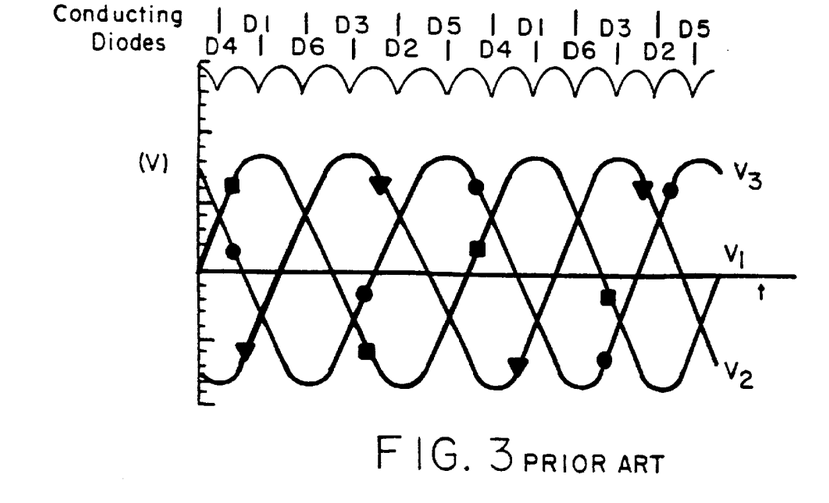
FIG. 3 is a graphical representation of the rectified and unrectified output of an alternator using the bridge of FIG. 2.

A prior art rectifier bridge is depicted in FIG. 2. Prior art rectifier bridges for vehicular alternators have typically used an arrangement of diodes D1–D6, which serve as electrical check valves. Each of the three phases V1–V3 is connected to two diodes, such that the negative and positive AC output of each phase are each rectified into DC voltage. FIG. 3 depicts the output that results from the prior art diode bridge, as is well known to those skilled in the art.

The prior art rectifier bridge is very dependable and has been used successfully in claw pole, synchronous (Lundell) alternators in vehicles for decades. However, the modern era has placed increasing power demands on vehicle electrical systems through the constant addition of new electrical and electronic accessories, control systems, etc. to the vehicle. It has also become increasingly less desirable to solve these power requirement problems through increasing the size of the alternator, as available space under the hood of the modern vehicle is densely packed. Further, the additional engine power required to turn a larger alternator decreases overall efficiency of the vehicle, as does the additional weight. Finally, overall cost is an extremely important criterion in evaluating vehicular design solutions, rendering a larger more costly alternator less desirable.

A result of the increasing demands placed on the alternator is that often when the engine is at an idle, when alternator speed and hence power output efficiency are quite low, a deficit in the charging system results. In such situations, the battery supplies the required energy in a discharging state. Repetitive charging and discharging of batteries used in vehicles, typically lead-acid storage batteries, leads to shorter longevity, which is undesirable both from the point of view of the consumer and the environment.

One limitation of the diode is that it is not controllable in the sense that its switching points are inherent in its design. The prior art contains other arrangements, which replace the diodes of a conventional rectifier or inverter bridge with controllable elements, such as transistors or thyristors, but satisfactory control regimens for these controllable elements have been difficult to achieve and have not been successfully implemented.

U.S. Pat. No. 4,489,323 discloses a three-phase alternator whose output is rectified by a full wave thyristor, or semiconductor-controlled rectifier (SCR), bridge. One phase output is measured to generate a square wave in order to determine the speed of the alternator, so that the full-wave rectification can be switched to half-wave rectification when the speed of the alternator becomes too fast for the SCRs to fire reliably for proper rectification. The disadvantage with SCRs is that they naturally commutate with zero crossings of fundamental voltage waveform, rendering them less amenable to control. This apparatus disadvantageously does not address the problems associated with underspeed operation, only those associated with overspeed operation and SCR switching reliability.

Figure 4:
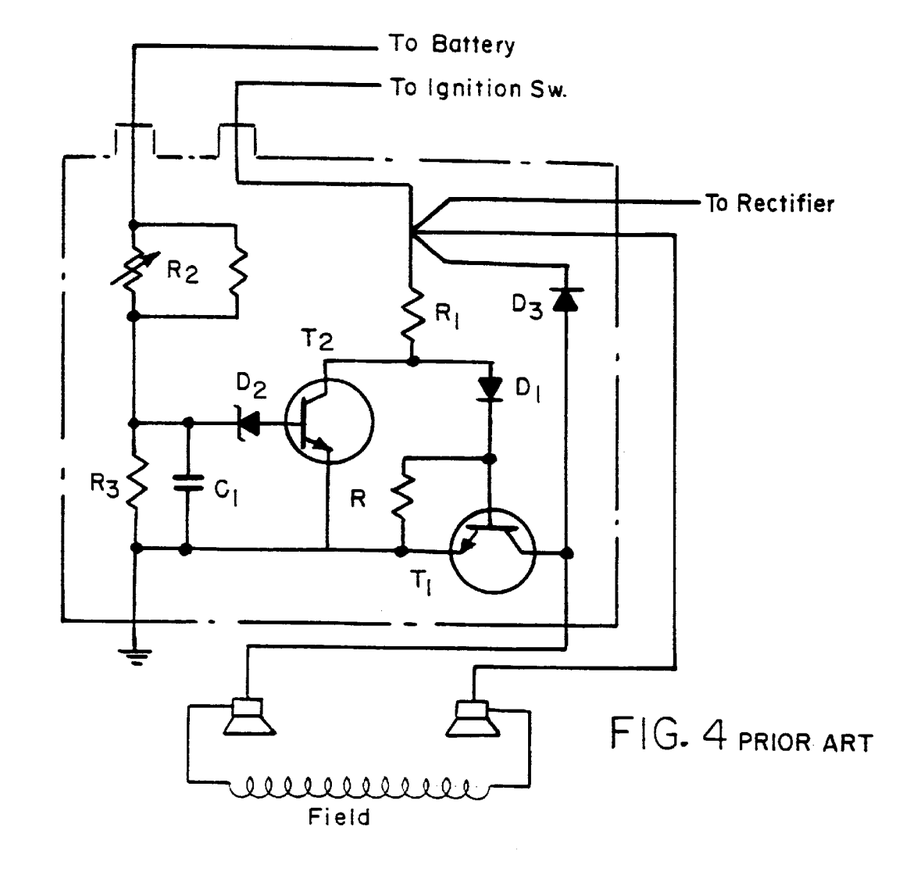
FIG. 4 is a graphical representation of the three-phase output of an alternator showing the six switching points for the synchronous rectifier and the phase advance angle $\alpha$.

U.S. Pat. No. 5,648,705 discloses a system for improving the power output of a vehicular alternator at low speeds through the use of a controllable rectifier bridge. A current detector and a voltage detector measure the state of one phase of the three-phase stator winding, and this information on the state of the single phase is passed to a controller. The controller uses the information provided by the detectors to control a full-wave controlled rectifier bridge in order to optimize the phase shift between the back EMF in the stator winding and phase voltages at the three output connections of the stator winding. The functioning of the device defined in this patent in its basic phases can be understood starting with reference to FIG. 5 of the patent, which describes a prior art alternator device comprising a conventional diode rectifier. For a Lundell alternator such is commonly used in vehicles, the power angle β represents the angle between the back EMF and the phase voltage (V). As can be seen on the bottom vector of FIG. 5, a conventional diode bridge has an angle of zero between the current (I) and voltage (V). The resulting angle β is therefore less than 90 degrees, which results in a lower power output $jIX_s$. It is accordingly desirable to increase the power angle β. To avoid the use of rotation sensors, and because the EMF cannot be directly measured during loading of the alternator because it cannot be electromagnetically separated from the armature current (reaction), the '705 device and methodology measure the current and the voltage of a single phase of the stator winding. By these measures, the synchronous frequency of the alternator can be determined, which reveals certain information about the back EMF. This information can then be used to maintain a phase shift a between the phase current and its associated phase voltage to maximize output, as seen in FIG. 4. The phase shift can be induced by controlling the switching of the rectifier bridge. The control strategy employed uses a phase current detector and a phase voltage detector to estimate the position of the back EMF from the determined phase current and voltage. This estimated position provides an existing delay angle between the phase current and voltage, which is compared to a desired delay angle read from experimentally determined optimum values in a look-up table. The controllable bridge switching is then manipulated to match the estimated delay angle to the optimum angle. Disadvantageously, this control regimen requires the measuring of current and voltage, which requires two sensors and the electronics to gather and process the two data.

U.S. Pat. No. 5,793,167 discloses a system for increasing output power from an alternator, wherein a conventional full-wave diode bridge of the alternator is replaced with a full-wave controlled rectifier bridge having controlled switches in place of diodes, and the rectifier bridge is controlled in response to a third harmonic of the voltage generated by the alternator to synchronize the rectifier bridge with the alternator. The alternator includes a rotor having a field winding receiving a field current, which is controlled up to a maximum field current for partial control of the output power produced by the alternator. Power produced by the alternator is also controlled by introducing a phase angle between the phase voltages at the three output connections of the stator winding and the third harmonic up to a maximum or optimum phase angle. To increase power output from the alternator, the field current is increased up to a maximum before any phase angle is introduced between the phase voltages and the third harmonic. Similarly, the phase angle is reduced to zero before the field current is reduced if power generated by the alternator is to be decreased. Disadvantageously, this control technique also requires the measuring of current and voltage, thereby requiring two sensors and the electronics to gather and process the two data.

The voltage regulator, a major part of the charging system, controls the output of the alternator by controlling the excitation current in the field windings. By changing the excitation current in the field windings in the rotor, the strength of the magnetic field of the rotor is affected, and thus the output of the stator windings of the alternator. Prior art voltage regulators typically are preset to maintain the charging voltage of the alternator at a predetermined point, typically between 13 and 15 V. In an automotive charging system, in order for the battery to recharge, the output voltage of the alternator must be higher than that of the battery. However, a large difference can overload the battery, causing electrochemical damage, which decreases its longevity. For this reason, only a small potential difference above the typical 12 to 12.6 V of a fully charged battery is used. Because the rotational speed of the alternator varies with engine speed, the voltage regulator is necessary to maintain the voltage of the alternator output.

Figure 6:
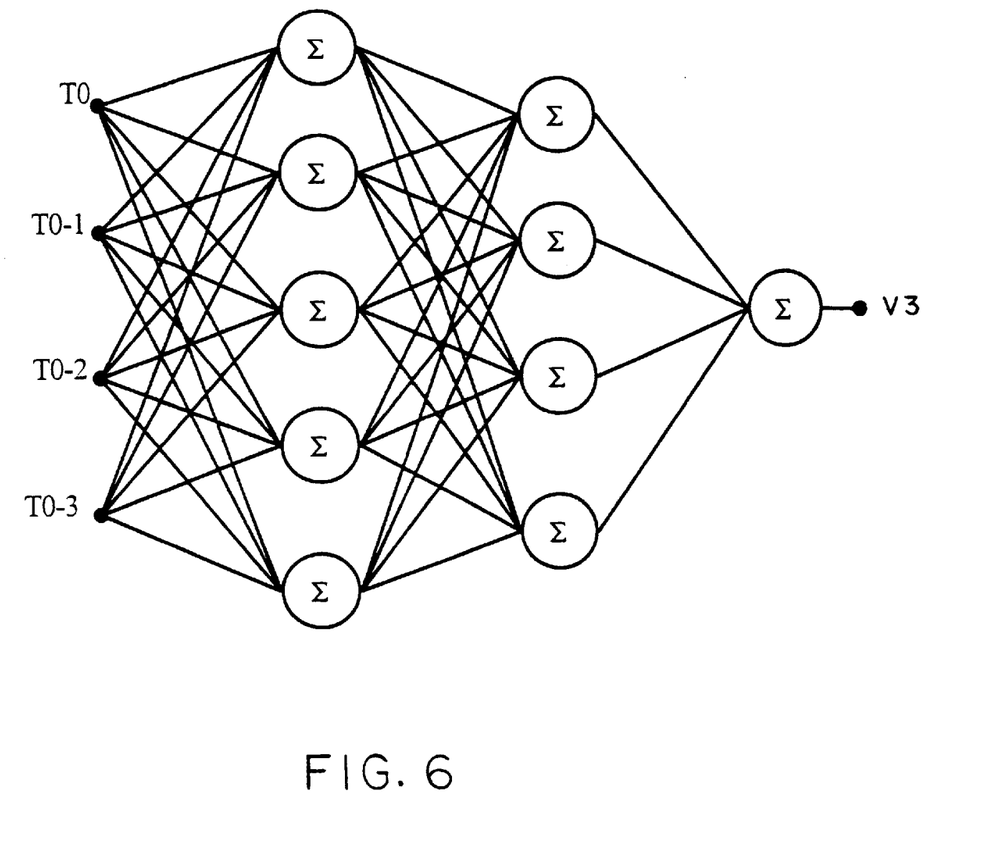
FIG. 6 is a schematic representation of a prior art voltage regulator.

A prior art electronic voltage regulator is depicted in FIG. 6. By placing resistances in and out of series with the excitation field current (which is supplied in most cases by the battery), the strength of the excitation field in the rotor can be modified. In this embodiment, if the alternator speed is too low and/or electrical load too high, the regulator will compensate so that the alternator achieves a preset voltage output. Other systems vary the duty cycle of the field windings in order to arrive at a preset voltage output. During periods of low output, the duty cycle could be as low as 10%.

SUMMARY OF THE INVENTION

In a preferred embodiment of the present invention, a charging system comprises an alternator; a battery; a controlled rectifier bridge having controllable elements, the bridge being connected between the alternator and the battery; a controller; and a single voltage sense line connecting the alternator and the controller for providing a voltage value to the controller, wherein the controller determines the alternator output using the voltage value.

According to one feature, the controlled rectifier bridge is a half-wave controlled rectifier bridge having controllable elements in one portion of the bridge and diodes in another portion of the bridge, wherein the controllable elements comprise three controllable switches, the charging system further comprising gate drivers for the controllable switches, wherein the controller computes zero crossing points for a third harmonic voltage to determine switching points for controlling the gate drivers.

In another embodiment, a method for operating a charging system having a battery, an alternator, a controlled rectifier bridge having controllable elements, and a controller for controlling the duty cycle of the alternator field and the phase advance angle of the controllable elements, comprises the steps of initializing the controller to a predetermined value for the phase advance angle of the controllable elements and the duty cycle of the field; periodically measuring voltage from a single phase of the alternator for determining alternator output and load demand on the electrical system; comparing alternator output and load demand to determine whether there is a deficit or excess in alternator output; and adjusting the output of the alternator according to the results of the comparing step.

In still another embodiment, a charging system comprises an alternator; a battery; a controlled rectifier bridge having controllable elements, the bridge being connected between the alternator and the battery; a controller; and a third harmonic extraction device for determining the zero crossings of the third harmonic voltage; wherein the controller controls the switching of the controllable elements of the controlled rectifier bridge to control the phase advance angle of the controllable elements in response to the zero crossings of the third harmonic provided by the third harmonic extraction device.

In yet another embodiment, a method for operating a charging system having a battery, an alternator, a controlled rectifier bridge having controllable elements, a third harmonic extraction device and a controller for controlling the duty cycle of the alternator field and the phase advance angle of the controllable elements, wherein the third harmonic extraction device comprises a neural network, comprises the steps of determining the zero crossings of the third harmonic employing said neural network by means of a single phase voltage input; and determining the switching points of the controllable elements of said controlled rectifier bridge based on said zero crossings.

One embodiment of the present invention provides an alternator having a half-wave controlled rectifier bridge with three controllable elements and three diodes. By combining diodes and controllable elements in a half-wave rectifier, costs are decreased, manufacturing and diagnostics are rendered simpler, and the overall reliability of the charging system is enhanced compared to a full-wave controlled rectifier bridge. Further, the half-wave controlled rectifier bridge offers, compared to a conventional six-diode rectifier, more efficient controllable performance.

Advantages of the alternator having a half-wave controlled rectifier bridge include increased control when compared to six-diode bridges, without the full costs of full-wave controlled rectifier bridges. The half-wave controlled rectifier bridge dispenses with three controllable elements, such as FETs, and their associated gate drive circuitry. A further advantage results from the standpoint of reliability. Decreasing the number of electronic components increases reliability. This is particularly advantageous in rectifiers in vehicle alternators, because under certain abnormal or fault conditions, a full-wave controlled rectifier circuit can actually discharge the battery by monitoring the alternator, or by creating a shorted condition. The instant invention provides the advantage of providing three diodes that cannot discharge the battery under virtually any condition.

The present invention also provides a switching strategy for a controllable rectifier bridge, which allows for increased output from a Lundell generator based on a single voltage input from a single phase of the alternator. Further, the present invention provides for the smart optimization of the duty cycle of the field winding before advancing the phase angle to optimize the output of the alternator. This arrangement advantageously allows for the elimination of sensors and circuitry in the prior art, leading to cost savings while enhancing performance and reliability.

Additional advantages include the thermal benefits of requiring less electronics in the alternator controller. Further, in the half-wave controlled rectifier bridge of the instant invention the controllable elements are preferably placed in the upper portion of the bridge, thus the drains are in common. This eliminates the need for isolation required for the drains of the lower portion of the rectifier bridge, which would be required in a full-wave controlled rectifier bridge. This effectively eliminates two thermal interfaces, providing the instant invention with clear thermal advantages.

BRIEF DESCRIPTION OF THE DRAWINGS

These and other features and advantages of the present invention will become more apparent in view of the following detailed description in conjunction with the accompanying drawing, of which:

FIG. 7B is a schematic representation of another aspect of the present invention.

DETAILED DESCRIPTION OF THE INVENTION INCLUDING ILLUSTRATIVE AND PREFERRED EMBODIMENTS

The present invention will be described herein with reference to illustrative embodiments of synchronous rectifiers and single feedback control for a vehicular alternator. The synchronous rectifiers and single feedback control are also described in U.S. provisional application Nos. 60/084, 970 and 60/084,941, both of which are hereby incorporated by reference.

Figure 7A:
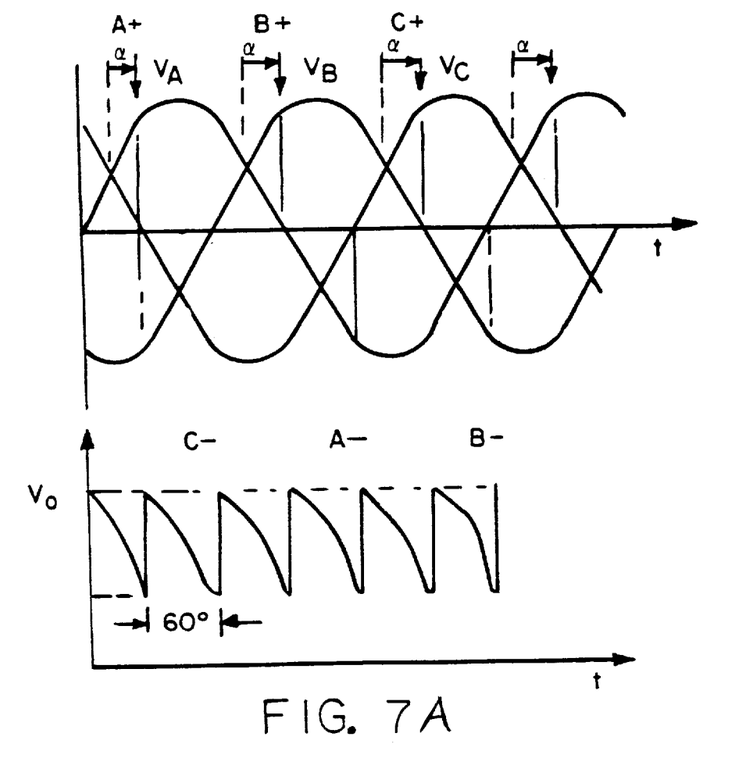
FIG. 7A is a schematic representation of one aspect of the present invention.

The system 100 according to the present invention is schematically illustrated in FIG. 7A. It comprises in relevant part, an alternator having a three-phase stator winding 102 with three output connections A, B, and C, and a rotor magnetically coupled thereto as well known. In a preferred embodiment, the rotor is delta configured, trapezoidal wound, which produces a third harmonic $V_3$ waveform along with the fundamental, as will be discussed in greater detail below. In one embodiment, a controlled rectifier bridge 104 contains three upper controlled switches corresponding to the positive half cycles of each phase, denoted A+, B+, and C+, and three lower diodes corresponding to the negative half cycles of each phase, denoted A−, B−, and C−, thereby implementing a half-wave controlled rectifier bridge. It should be noted that the diodes A−, B−, and C− might alternatively be placed in the upper portion of the bridge and the controlled switches A+, B+, and C+ placed in the lower portion of the bridge. In another embodiment shown in FIG. 7B, the controlled synchronous rectifier 104 contains the three upper controlled switches A+, B+, and C+, and three lower controlled switches in place of the three lower diodes A−, B−, and C−, thereby implementing a full-wave controlled rectifier bridge. The power output of the rectifier bridge 104 is connected to the battery 106 and the load 108 of the vehicle. Gate drivers 110 control the firing of the controlled switches, and are themselves controlled by the controller 112. The controller is responsive to the back EMF through, for example, the measurements of the voltage sensor line 114 and, preferably, computes the third harmonic $V_3$ to determine the switching points for control the gate drivers 110 of the rectifier bridge 104. The controller also determines the phase advance angle $\alpha$ of the controlled switches by controlling the phase shift between the back EMF as measured in the stator winding to which the voltage sense line 114 is connected and the phase voltages at the three output connections of the stator winding. The phase advance angle $\alpha$, also known as the firing angle, is defined herein as the angle by which the phase current leads the phase voltage. In this arrangement, a single voltage sensor is provided at a single phase of the alternator, the output from which is processed by the controller 112.

Although the varying of α is known for controlling the firing of the rectifier switches, it is generally necessary to know the position of the rotor in relation to the stator in order to provide a benchmark. One solution is to provide a rotation sensor on the rotor, but this solution is undesirable because it adds cost and critical components, which contribute to the failure rate of the system. The position can be determined from the voltage or EMF measured at the alternator when it is not running under load, however the EMF cannot be directly measured during loading of the alternator because it cannot be electromagnetically separated from the armature current.

Figure 5:
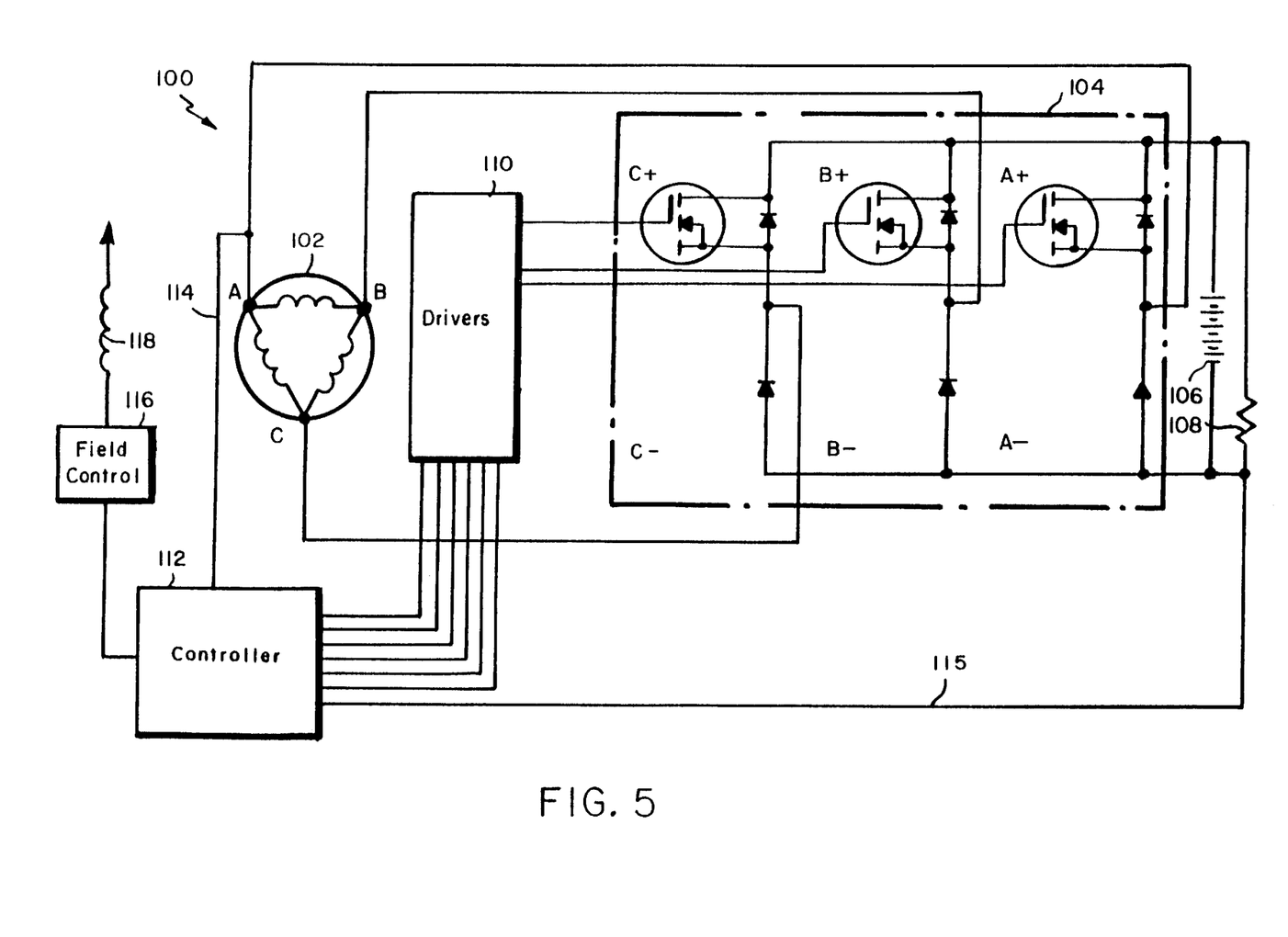
FIG. 5 is a graphical representation of the raw no load phase voltage and the third harmonic waveform as a function of time.

A solution to this problem is presented through $V_3$, or the third harmonic waveform of the voltage. As can be seen in FIG. 5, the third harmonic $V_3$ is plotted along with the unloaded back EMF or phase voltage $V_p$. $V_3$ is particularly attractive, because its zero-crossings occur six times over a full cycle of $V_p$ and it provides an ideal benchmark for the switching points for the controllable elements of the rectifier switches as mentioned above. Further, even when the firing angle of the switching is advanced by α, the third harmonic points will not vary because there is no third harmonic of the current.

It has been found that a delta configured trapezoidal wound Lundell alternator provides a desirable back EMF output which produces third harmonic waveforms along with the fundamental. The instant invention provides for the determination of $V_3$ from a voltage measured from a single phase of the alternator. In a preferred embodiment of the instant invention, neural network pattern recognition software is employed to extract the third harmonic from the single sensed voltage.

Figure 8:
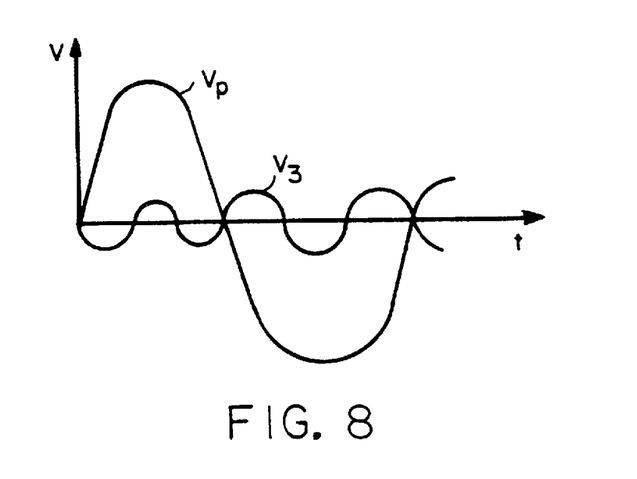
FIG. 8 is a schematic representation of a neural network for extracting third harmonic voltages from a single-phase voltage.

A neural network employed in the present invention is depicted in FIG. 8. The network depicted is of the back-propagation type. The inputs to the network are depicted to the left, representing the voltage of single phase of the alternator. Which phase is used is not important, because as discussed herein, the third harmonic output is not dependent on the phase voltage. The top input T0 represents the current phase voltage, with T0-1, T0-2 and T0-3 representing the three previous voltages chronologically. These values are updated during operation, and cascaded downwardly with the fourth most recent phase voltage dropping from the network inputs.

Each of the inputs is connected to each of the five summing nodes of the input layer of the neural network. Each of these connections is assigned a weight, which is determined by a compiler during the learning phase of the network implementation, as will be discussed hereinbelow. Each of the five summing nodes of the input layer is also assigned a gain.

Each of the five summing nodes of the input layer is connected to each of four summing nodes comprising a hidden layer. Each of these connections is also assigned a weight, which is also determined by a compiler during the learning phase of the network implementation, as will be discussed hereinbelow. Each of the four summing nodes of the hidden layer is also assigned a gain.

Each of the four summing nodes of the hidden layer is connected to a single summing node comprising the output layer. As with the input and hidden layers, each of these connections is also assigned a weight, which is also determined by a compiler during the learning phase of the network implementation. The summing node of the output layer is provided with an output connection, the output in the operational network providing the third harmonic voltage.

The neural network of an illustrative embodiment can be designed using commercially available software, such as NeuroModel® available from Atlan-Tec® KG.

To configure the neural network, a training file is established representing input values for the network, and the third harmonic output. Using this file, the network is trained to produce the correct output for given inputs. Initially, the network is configured with initial values, and as compilation of the neural module proceeds, the network trains itself by adjusting the weights of the connections and the gains of the summing nodes.

Some experimentation is necessary to determine the number of inputs, and the number of summing nodes until the behavior of the network is acceptably accurate. Once a baseline configuration is established, the network is guided in an interactive fashion to arrive at better performance. During training, the network compiler attempts to seek out regions that correspond to a lower error rate. Sometimes these lower rates occur as localized minima, which are not necessarily the global minimum. In the interactive training of the network, the compiler is forced from localized minima to ensure that the true global minimum is found. The result of the interactive training is the changing of certain learning parameters, which guide the compiler about the infinite space of variables in search of convergences at lower error values.

Appendix A included in the above-mentioned U.S. provisional application Nos. 60/084,970 and 60/084,941 is a validation report of an illustrative embodiment of the neural network. Given the learning parameters specified, the illustrative neural network provided a maximum deviation of 17.7%, with a standard deviation of 3.1%. However, the worst errors are encountered far from the zero crossings of the third harmonic, which are the critical values to be detected by the network. For example, referring to record 1 of the validation report, the target value is of 0.1, which is close to zero, and the deviation is only 0.92% on the response. Referring to record 15, with a target of 0.25, also close to zero, reports a deviation of 1.26%. Therefore, the illustrative model performs very accurately within the critical range of values. By comparison, the largest fluctuations occur in a range of values, which is unimportant. For example an error percentage of 10.3 is reported in record number 59, where the target is 219, quite distant from the zero crossing.

Further improvement of the neural network can be achieved through more interactive iterations with the compiler. Further, the outputs can be time averaged through a FIFO routine for multiple, e.g., ten (10), measurements. This type of FIFO routine could also be used for other purposes, such as calculating speed from the network output. Advantageously, by averaging the output over ten (10) readings, the error is reduced tenfold.

Once the network is finalized, it is burned into ROM (not shown) or other memory device and deployed to provide the third-harmonic switching points to the alternator controller.

Returning now to FIG. 7A, the controller 112 monitors the load of the electrical system via a sense line 115. The controller 112 also controls a field control circuit 116, which is connected to the excitation field 118 of the alternator. By controlling the excitation current provided to the field winding, the output of the alternator can be controlled accordingly. As will be described in greater detail below, the smart controller 112 is able to serve as the voltage regulator in the alternator according to the instant invention. This combination of functions in a single controller dispenses with the need for a separate voltage regulator as required in the prior art, and advantageously provides for cost savings associated therewith.

As can be seen in FIG. 4, the controllable switches A+, B+, and C+ are turned on during the positive half cycles of the voltages of the phases to which they are connected and the diodes A−, B−, and C− are turned on during the negative half cycles of the voltages of the phases. For the embodiment shown in FIG. 7B, the controllable switches A−, B−, and C− are turned on during the negative half cycles of the voltages of the phases. The DC output of the alternator in terms of voltage and current is controlled by adjusting the firing angle α.

The controller in a preferred embodiment is a PIC 16C73A available from Microchip™. This controller is preferably configured with 4KB×14 internal PROM, 192×8 bytes, internal scratchpad RAM, 3 timer modules, 2 PWM modules, 5 analog inputs to one A/D converter, 2 8-bit programmable I/O ports, 1 synchronous serial port, and 1 USART serial communications module. With an external crystal oscillator set at 20 MHz, the internal clock rate resulting is 5 MHz.

According to a preferred embodiment, the operation of the synchronous rectifier proceeds as follows. The voltage sensor senses the phase voltage at one stator phase winding at sense line 114 as seen in FIG. 7A, and the third harmonic of the voltage, $V_3$, is calculated by the controller 112. The $V_3$ value is useful because six-step switching of the rectifier bridge can be synchronized from one step to the next by the six zero-crossings of $V_3$. From these zero crossings, the phase angle α can be introduced to the switching control so that the phase current advances the phase voltage in the upper portion of the bridge. The zero crossings of $V_3$ occur exactly at one-sixth intervals of the back EMF cycle. Because the diodes do not need to be switched, each of the six switching intervals will include the activation or deactivation of at least one of the controlled switches in the half-wave controlled rectifier, or two of the controlled switches in the full-wave controlled rectifier. The controller calculates when to perform the switching operations based on the value of $V_3$ adjusted for the phase advance angle α. For 0<α<90°, DC output is positive. With a controlled rectifier bridge, it becomes possible to select α such that the power output of the rectifier matches the power demand and battery voltage is maintained at a maximum over all operating speeds, field currents, and temperatures of the alternator.

The instant invention provides for varying the PWM duty cycle of the excitation coil in the alternator before beginning the process of phase advance. To increase output, the field current is first increased by increasing the duty cycle of the field winding, while the phase advance of the rectifier is kept at zero. After the field current reaches its predetermined maximum, the controller begins to increase the phase advance angle α to further increase output.

Operation of the system will be described by reference to flowchart FIGS. 9 through 11.

Figure 9:
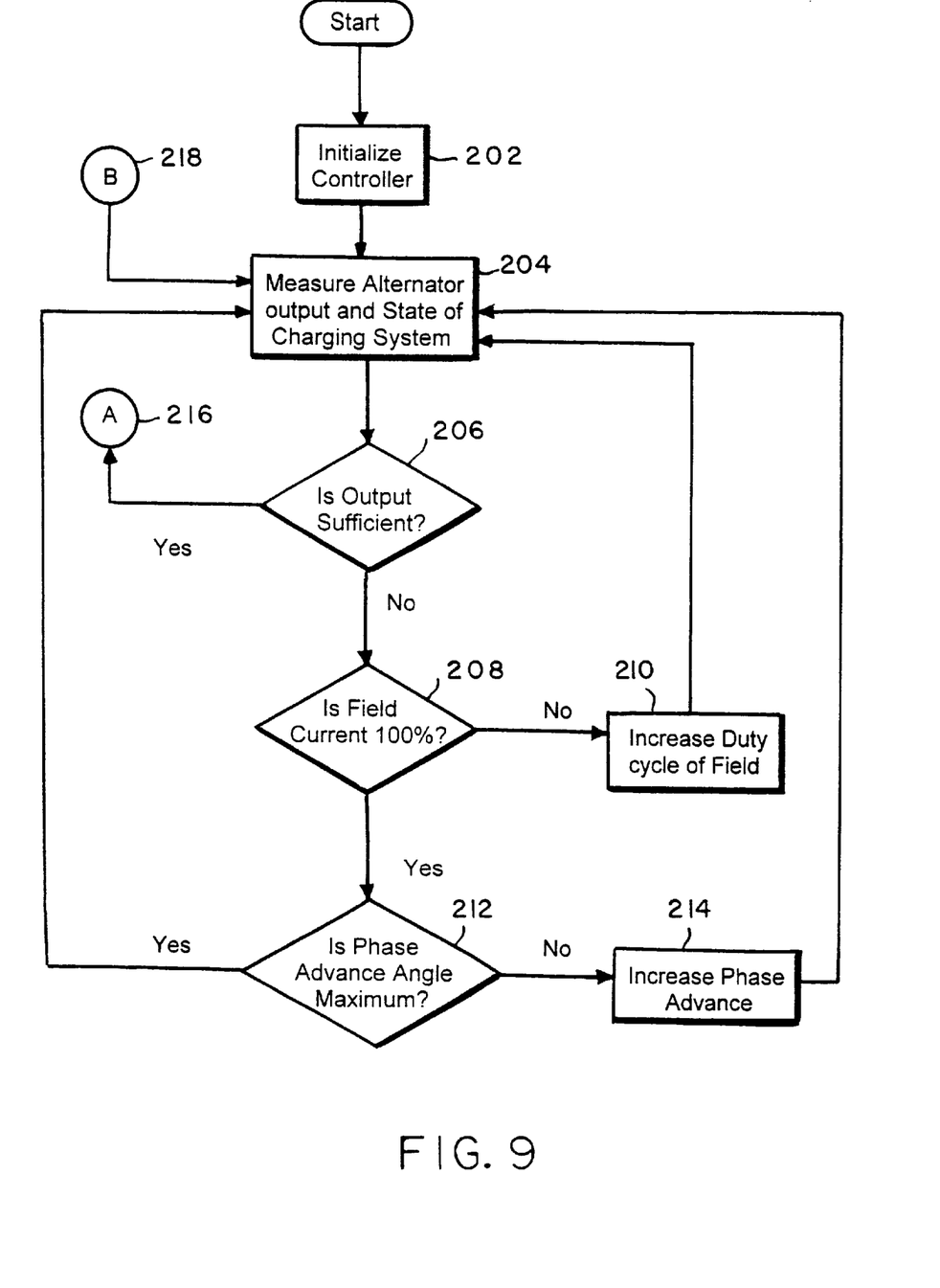
FIG. 9 is a flowchart representation of the operation of the alternator controller according to one aspect of the instant invention.
Figure 10:
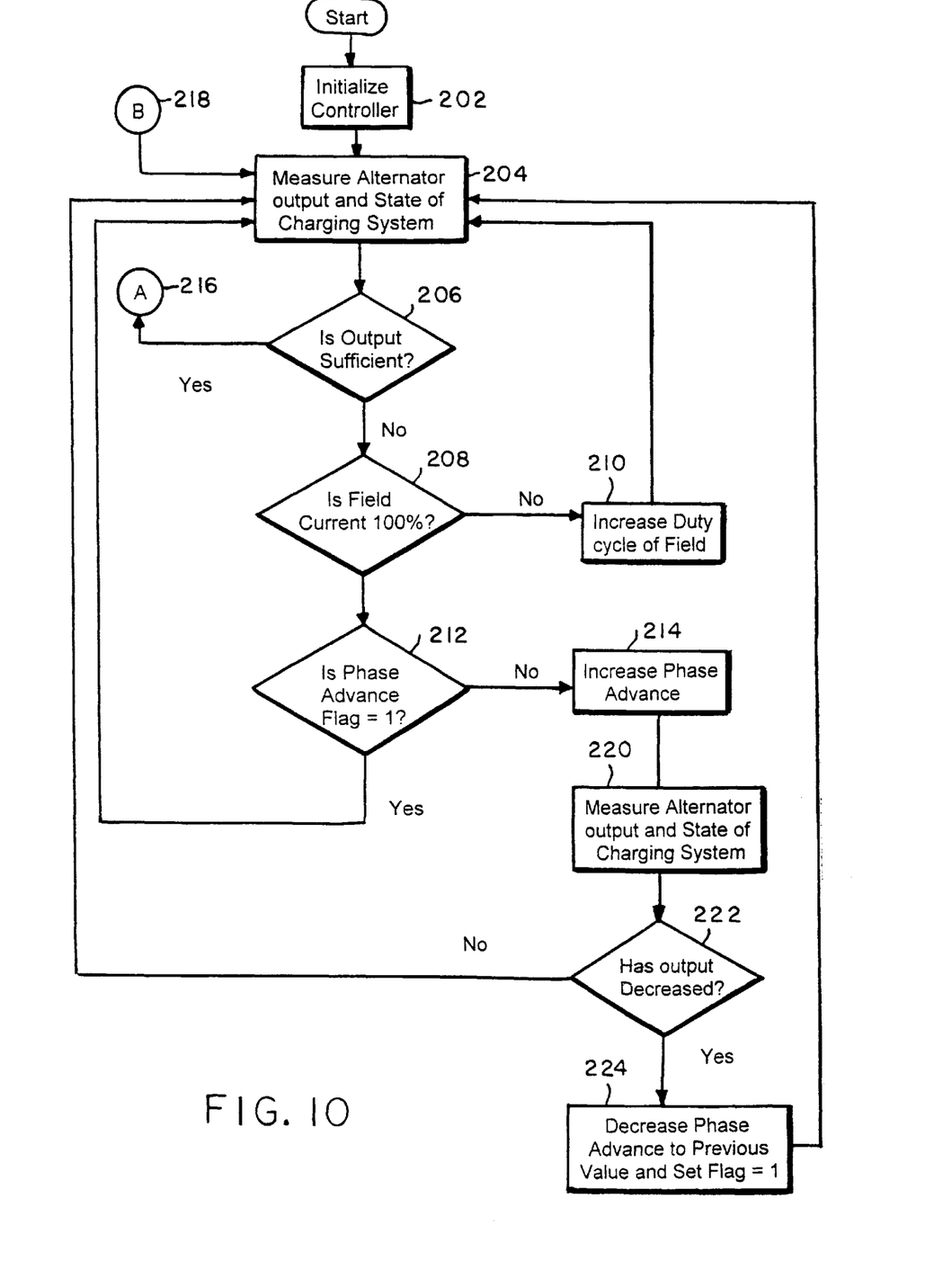
FIG. 10 is a flowchart representation of the operation of the alternator controller according to another aspect of the instant invention.

Referring to FIGS. 9 and 10, when the system is started and comes on-line, an initialization routine step 202 sets the phase advance angle α for the switching of the synchronous rectifier to zero degrees, and the duty cycle of the field controller FET is set to 20%. The step 202 may also include a synchronization routine that determines which phase to associate with each of the six zero crossings of the $3^{rd}$ harmonic waveform. In particular, the synchronization routine includes holding the FET drive signals low and looking for the natural commutation. As the system runs, the system will measure the output of the alternator, i.e., the voltage from a single phase of the alternator, and the state of the charging system at step 204. In this step, the controller will update itself periodically concerning the output of the alternator compared to the load. In step 206, the controller will ascertain whether the charging system is in a state of discharge. In such a situation, power must be increased. The controller will first begin to increase the duty cycle of the field controller FET. At step 208, the field is checked by ascertaining whether the duty cycle of the field controller FET is 100%. At this point, the phase advance angle α of the controllable elements of the synchronous rectifier remains zero degrees. This is desirable at low output ranges because the phase current and phase voltage are in phase with one another, so increasing the duty cycle of the field controller FET is the quickest and most efficient means to increase the output. If the duty cycle is not 100%, it is increased at step 210, and the controller resumes its monitoring at step 204. If the duty cycle of the FET is 100%, then the field is at its maximum. At step 212, the system checks to see if the phase advance angle α for the controllable elements is at a preset maximum in FIG. 10. If the phase advance angle α is less than its maximum, then the controller begins to increase the phase advance angle α at step 214, which results in delayed switching of the synchronous rectifier controllable elements. By advancing the phase advance angle α above zero degrees, additional power can be extracted from the alternator. The controller then performs a stepwise increase of the phase advance angle α until a predetermined maximum. In FIG. 10, the phase advance angle α is advanced until the output begins to decrease, which will normally occur somewhere in the vicinity of 30°. As seen in FIG. 10 at step 220, the alternator updates itself immediately after increasing the phase advance angle α. If a decrease in performance is noted at step 222, then the value for α is returned to its previous value, and a flag is set. When the steps are executed in the future, the flag is checked at step 212 to ascertain whether the phase advance is at its observed maximum. Of course, if a decrease in performance is not noted, the controller proceeds to update itself at step 204.

In each of FIGS. 9 and 10, subroutine exit points A are indicated as step 216. If the output of the alternator is determined to be sufficient, the routine checks to see whether more power than is necessary is being produced. The subroutine for decreasing output is seen in FIG. 11. The controller checks whether the output is excessive in step 226. If it is not, then the system is behaving optimally for the given conditions, and the main loop is reentered at node B, denoted as step 218. If the output is excessive, then the controller either reduces the phase advance angle α for the controllable elements or the field controller FET duty cycle, as appropriate. In step 228, the controller checks whether the field controller FET is at 100% duty cycle. This indicates that α may be zero or greater. At step 232, the controller 112 checks the value for α, and if it is zero the field control FET duty cycle is decreased from 100%. If α has a nonzero value, then α is decreased. The main routine is then reentered at node B.

Figure 11:
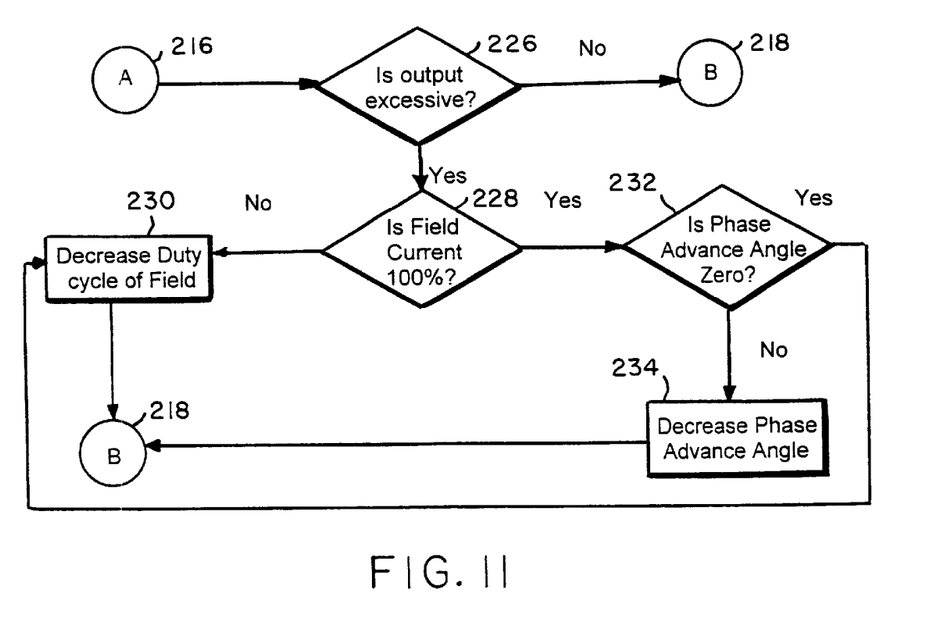
FIG. 11 is a flowchart representation of the operation of the alternator controller according to yet another aspect of the instant invention.

Of course, the steps taken in FIGS. 9–11 are logical examples only, and the exact steps taken, their order and sequence to arrive at the same result may be varied.

Although the present invention is described with reference to certain components, such as rectifier FETs, diodes, a microcontroller, a field controller FET, and the like, it should be understood that other equivalent components may of course be substituted. For instance, the controllable elements of the rectifier can be transistors, the FET in the field controller can be another type of semiconductor switch device, such as a transistor, and the controller might be a digital signal processor or other type of microprocessor.

Further, although the invention has been shown and described with respect to exemplary embodiments thereof, various other changes, additions and omissions in the form and detail thereof may be made therein without departing from the spirit and scope of the invention.

What is claimed is:

1. A charging system comprising:

an alternator having a plurality of phase windings;

a battery;

a controlled rectifier bridge having controllable elements, the bridge being connected between the alternator and the battery; a controller; and a single voltage sense line connecting only one alternator phase winding and the controller for providing a voltage value to the controller, wherein the controller determines the alternator output using the voltage value.

2. The charging system according claim 1, wherein the controller controls the duty cycle of the alternator field winding.

3. The charging system according claim 1, wherein the controller controls the switching of the controllable elements to control the phase advance angle of the controllable elements.

4. The charging system according claim 3, wherein the controller further controls the duty cycle of the alternator field winding.

5. The charging system according to claim 3, wherein said controller further determines switching points for controlling the controllable elements using said voltage value from said single voltage sense line.

6. The charging system according to claim 1, wherein the controlled rectifier bridge is a half-wave controlled rectifier bridge having controllable elements in one portion of the bridge and diodes in another portion of the bridge, wherein the controllable elements comprise three controllable switches, said charging system further comprising gate drivers for the controllable switches, wherein the controller computes zero crossing points for a third harmonic voltage to determine switching points for controlling the gate drivers.

7. The charging system according to claim 6, wherein the controllable elements are in an upper portion of the bridge and the diodes are in a lower portion of the bridge.

8. A method for operating a charging system having a battery, an alternator, a controlled rectifier bridge having controllable elements, and a controller for controlling the alternator output, comprising the steps of:

(a) initializing the controller to a predetermined value for the phase advance angle of the controllable elements and the duty cycle of the field;

(b) periodically measuring voltage from a single phase of the alternator for determining alternator output and load demand on the electrical system;

(c) comparing alternator output and load demand to determine whether there is a deficit or excess in alternator output; and (d) adjusting the output of the alternator according to the results of step (c).

9. The method of claim 8, wherein the controlled rectifier bridge is a half-wave controlled rectifier bridge having controllable elements in one portion of the bridge and diodes in another portion of the bridge.

10. The method of claim 9, wherein the controllable elements are in an upper portion of the bridge and the diodes are in a lower portion of the bridge.

11. A method for operating a charging system as set forth in claim 8, further comprising controlling the duty cycle of the alternator field and the phase advance angle of the controllable elements.

12. The method of claim 11, wherein the step of adjusting the output of the alternator further comprises the steps of:

(e) if there is a deficit in alternator output, increasing alternator output by (1) increasing the duty cycle of the field if it is less than 100%; and (2) if the duty cycle of the field is 100%, increasing the phase advance angle by delaying the switching of the controllable elements if the phase advance angle is below a maximum.

13. The method of claim 12, wherein the step of adjusting the output of the alternator further comprises the steps of:

(f) if there is an excess in alternator output, decreasing alternator output by (1) decreasing the duty cycle of the field if phase advance angle is zero; and (2) decreasing the phase advance angle if it is greater than zero.

14. The method of claim 12, wherein the maximum phase angle is determined by the steps of:

advancing the phase angle from a previous value, and if alternator output declines, establishing the previous value as the maximum phase angle.

15. A charging system comprising:

an alternator;

a battery;

a controlled rectifier bridge having controllable elements, the bridge being connected between the alternator and the battery; and a controller; and a third harmonic extraction device for determining the zero crossings of the third harmonic voltage;

wherein the controller controls the switching of the controllable elements of the controlled rectifier bridge to control the phase advance angle of the controllable elements in response to the zero crossings of the third harmonic provided by the third harmonic extraction device.

16. The charging system according claim 15, wherein the third harmonic extraction device further comprises a neural network.

17. The charging system according claim 16, further comprising a single voltage sense line connecting said alternator and said third harmonic extraction device for providing a voltage value to the third harmonic extraction device; wherein said third harmonic detection device further determines the zero crossings of the third harmonic voltage using said voltage value.

18. The charging system according to claim 17, wherein said controller further determines switching points for controlling the controllable elements of said controlled rectifier bridge using said zero crossings of said third harmonic voltage provided by said third harmonic extraction device.

19. The charging system according to claim 15, wherein the controlled rectifier bridge is a half-wave controlled rectifier bridge having controllable elements in an upper portion of the bridge, and the controller controls the switching of the controllable elements in the upper portion of the bridge to control the phase advance angle in response to the zero crossings of the third harmonic provided by the third harmonic extraction device.

20. The charging system according claim 15, further comprising a single voltage sense line connecting said alternator and said third harmonic extraction device for providing a voltage value to the third harmonic extraction device; wherein said third harmonic detection device further determines the zero crossings of the third harmonic voltage using said voltage value.

21. The charging system according to claim 20, wherein said controller further determines switching points for controlling the controllable elements of said controlled rectifier bridge using said zero crossings of said third harmonic voltage provided by said third harmonic extraction device.

22. A method for operating a charging system having a battery, an alternator, a controlled rectifier bridge having controllable elements, a third harmonic extraction device and a controller for controlling the duty cycle of the alternator field and the phase advance angle of the controllable elements, wherein the third harmonic extraction device comprises a neural network, said method comprising the steps of:

(a) determining the zero crossings of the third harmonic employing said neural network by means of a single phase voltage input; and (b) determining the switching points of the controllable elements of said controlled rectifier bridge based on said zero crossings.

23. The method of claim 22, further comprising the step of adjusting the output of the alternator.

24. The method of claim 23, wherein the step of adjusting the output of the alternator comprises the steps of:

if there is an excess in alternator output, decreasing alternator output by decreasing the duty cycle of the field if phase advance angle is zero; and decreasing the phase advance angle if it is greater than zero.

25. The method of claim 22, wherein the controllable elements are in an upper portion of the bridge.

* * * * *